US007073735B2

(12) United States Patent
Wubben et al.

(10) Patent No.: US 7,073,735 B2
(45) Date of Patent: Jul. 11, 2006

(54) BOOM BREAKAWAY SYSTEM

(75) Inventors: Thomas Mark Wubben, Ankeny, IA (US); Kent Alvin Klemme, Ankeny, IA (US); Vernon Kent Gambleton, West Des Moines, IA (US); Brandon Cy Carlson, Ankeny, IA (US); William Anthony Brett, Ankeny, IA (US); Mathew T. Miller, Ankeny, IA (US)

(73) Assignee: Deere & Company, Moline, IL (US)

( * ) Notice: Subject to any disclaimer, the term of this patent is extended or adjusted under 35 U.S.C. 154(b) by 152 days.

(21) Appl. No.: 10/786,689

(22) Filed: Feb. 25, 2004

(65) Prior Publication Data

US 2005/0184175 A1 Aug. 25, 2005

(51) Int. Cl.
*B05B 3/00* (2006.01)
*B05B 3/18* (2006.01)

(52) U.S. Cl. .................. 239/722; 239/723; 239/726; 239/728; 239/730; 239/731; 239/732

(58) Field of Classification Search ............... 239/722, 239/723, 726, 728, 730, 731, 732
See application file for complete search history.

(56) References Cited

U.S. PATENT DOCUMENTS

| 3,949,539 | A | * | 4/1976 | Cartner ................... 56/10.4 |
| 4,168,800 | A | * | 9/1979 | Quick ..................... 239/164 |
| 4,183,195 | A | * | 1/1980 | James ..................... 56/11.9 |
| 4,344,572 | A | | 8/1982 | Tyler et al. |
| 4,506,464 | A | * | 3/1985 | Cartner ...................... 37/91 |
| 4,986,010 | A | * | 1/1991 | Cartner .................... 37/382 |
| 5,000,385 | A | | 3/1991 | Trusty et al. |
| 5,957,383 | A | | 9/1999 | Benest ................... 239/166 |
| 6,059,201 | A | | 5/2000 | Weddle ................. 239/164 |
| 6,119,963 | A | | 9/2000 | Bastin et al. ............ 239/168 |
| 6,293,475 | B1 | | 9/2001 | Sobolik |
| 6,334,492 | B1 | | 1/2002 | Hundeby ................. 172/126 |
| 6,581,639 | B1 | | 6/2003 | Fiala et al. ............ 137/596.2 |

OTHER PUBLICATIONS

Feb. 23, 2004, Ag-chem internet advertisement.

* cited by examiner

*Primary Examiner*—Davis Hwu

(57) ABSTRACT

Foldable boom inner wings are attached to a boom center frame through a rocker attached to a breakaway hydraulic cylinder pressurized to full stroke and connected to an accumulator. When a wing impacts an object, the impact load is transmitted through the fold cylinder and rocker into the breakaway cylinder. As the breakaway cylinder retracts to allow the wing to pivot, pressure builds in the system in three stages. First pressure builds along an accumulator pressure curve until a relief valve in the hydraulic system actives to initiate the second stage wherein oil is dumped through the relief valve. Thereafter, pressure is again allowed to build along the same accumulator curve to absorb impact hydraulically before the cylinder reaches full stroke. The staged pressure buildup prevents boom momentum from gaining and loads from increasing above the strength of the overall structure.

24 Claims, 4 Drawing Sheets

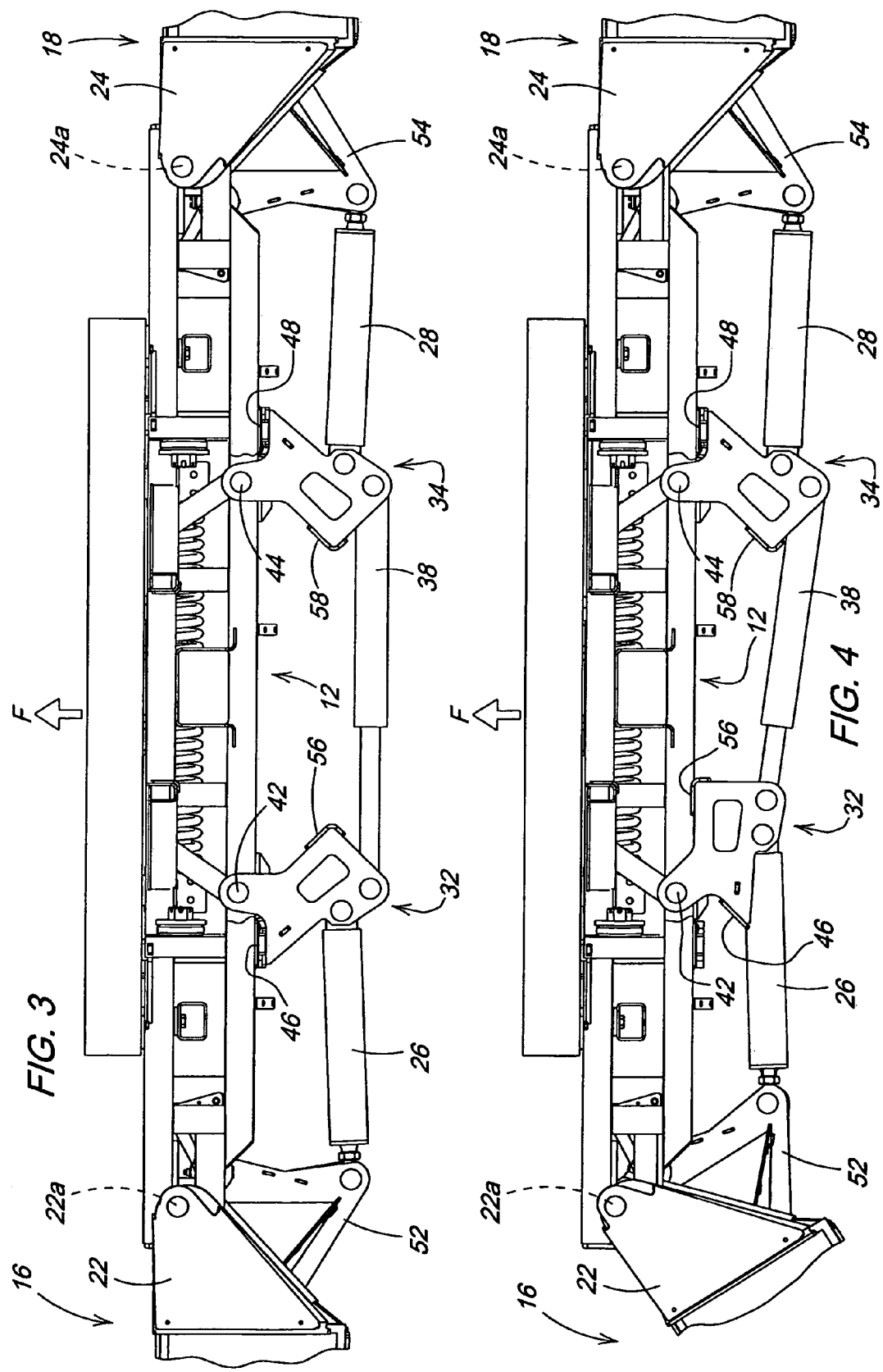

BOOM BREAKAWAY SYSTEM

FIELD OF THE INVENTION

The present invention relates generally to agricultural booms and, more specifically, to a breakaway boom for a field sprayer or the like.

BACKGROUND OF THE INVENTION

The boom of a modern agricultural sprayer typically includes folding wing structure that unfolds to a working width of 90 to 120 feet or more. The sprayer operator can apply chemicals at speeds ranging from 10 to 20 mph, and it is not uncommon for the boom to impact an obstacle in the field during sprayer operation. The sprayer boom wing structure can experience catastrophic damage rendering the sprayer unusable if the boom impacts an immovable object such as a telephone pole. The damage results in a costly and time-consuming wing repair. To reduce or eliminate such impact damage, various boom fold structure linkages have been devised to allow outer wings or the boom wing which is attached to the boom center frame to fold rearward during an impact. The amount of rearward travel must be adequate to allow several feet of the boom structure to clear an obstacle. If a hydraulic breakaway cylinder is utilized in the system, the boom impact energy must be sufficiently absorbed hydraulically before the cylinder reaches full stroke. Some presently available hydraulic systems include a complex and expensive cylinder with built-in cushioning orifices. The hydraulic system can be very complicated and expensive. Finding an economical breakaway system which can absorb sufficient amounts of the impact forces to limit overall boom loading to non-destructive levels while at the same time preventing excess boom momentum and oscillation has been a continuing source of problems.

SUMMARY OF THE INVENTION

It is therefore an object of the present invention to provide an improved breakaway system for a boom. It is a further object to provide such a breakaway system which overcomes most or all of the aforementioned problems.

It is yet another object of the present invention to provide an improved boom breakaway system which can absorb sufficient impact force to limit overall boom loading to non-destructive levels while at the same time preventing excess boom momentum and oscillation.

It is another object of the present invention to provide an improved breakaway system for a boom which is particularly useful for use with the large multi-section booms. It is yet another object to provide such a system which provides inner boom section pivoting relative to a center frame. It is a further object to provide such a system which provides a relatively large and controlled boom travel to clear an obstacle.

It is a further object to provide an improved hydraulically operated boom breakaway system. It is another object to provide such a system having a staged pressure buildup during breakaway which effectively absorbs impact energy hydraulically before a breakaway cylinder reaches full stroke. It is a further object to provide such a system which operates smoothly and effectively limits impact loads through the boom to reduce or eliminate structural damage during an impact.

Boom inner wings are attached to a boom center frame at hinge joints which normally allow the wings to fold 90 degrees from a forward transport position to an extended spraying position under the control of a hydraulic folding cylinder. In the present design, the fold cylinder, which in many previous designs extended between the center frame and inner wing, is attached to a rocker that is pivotally connected to the center frame. The rocker is attached to a breakaway hydraulic cylinder normally pressurized towards a full stroke position and connected to an accumulator. When a wing impacts an object, the impact load is transmitted through the fold cylinder, rocker and into the breakaway cylinder. If the load is large enough, the cylinder will begin to retract, and pressure in the system increases and follows a pressure curve dependent on the accumulator. As the breakaway cylinder retracts to allow the wing to pivot, pressure builds in the system in three stages. First pressure builds along an accumulator pressure curve until a relief valve in the hydraulic system activates to initiate the second stage wherein oil is dumped through the relief valve. Thereafter, pressure is again allowed to build along the same accumulator curve. This staged pressure build effectively absorbs the energy imported into the boom from impact hydraulically before the cylinder reaches full stroke. The staged pressure build also prevents boom momentum from gaining and loads from increasing above the strength of the overall structure.

The system is completely hydraulic and eliminates need for mechanical wear surfaces or adjustments. The hydraulic valve controls the deceleration of the breakaway cylinder at the end of stroke. Compared to systems having a cylinder with built-in cushioning orifices, the resulting system is less expensive and complex than at least most other commercially available hydraulic breakaway systems and facilitates a smooth spring-like absorption of the energy of a moving boom as the breakaway cylinder resistance force increases with retraction of the breakaway cylinder. The accumulator additionally provides a cushion effect for the entire boom under normal field operation.

These and other objects, features and advantages of the present invention will become apparent from the detailed description below when taken with the drawings.

BRIEF DESCRIPTION OF THE DRAWINGS

FIG. 3 is an enlarged top view of the center frame assembly of FIG. 1 with the left- and right-hand boom sections in the fully extended field-working positions.

FIG. 4 is an enlarged top view of the center frame assembly of FIG. 2 with the left-hand boom section in the breakaway position and the right-hand boom section in the fully extended field-working position.

DESCRIPTION OF THE PREFERRED EMBODIMENT

Figures 1, 2:
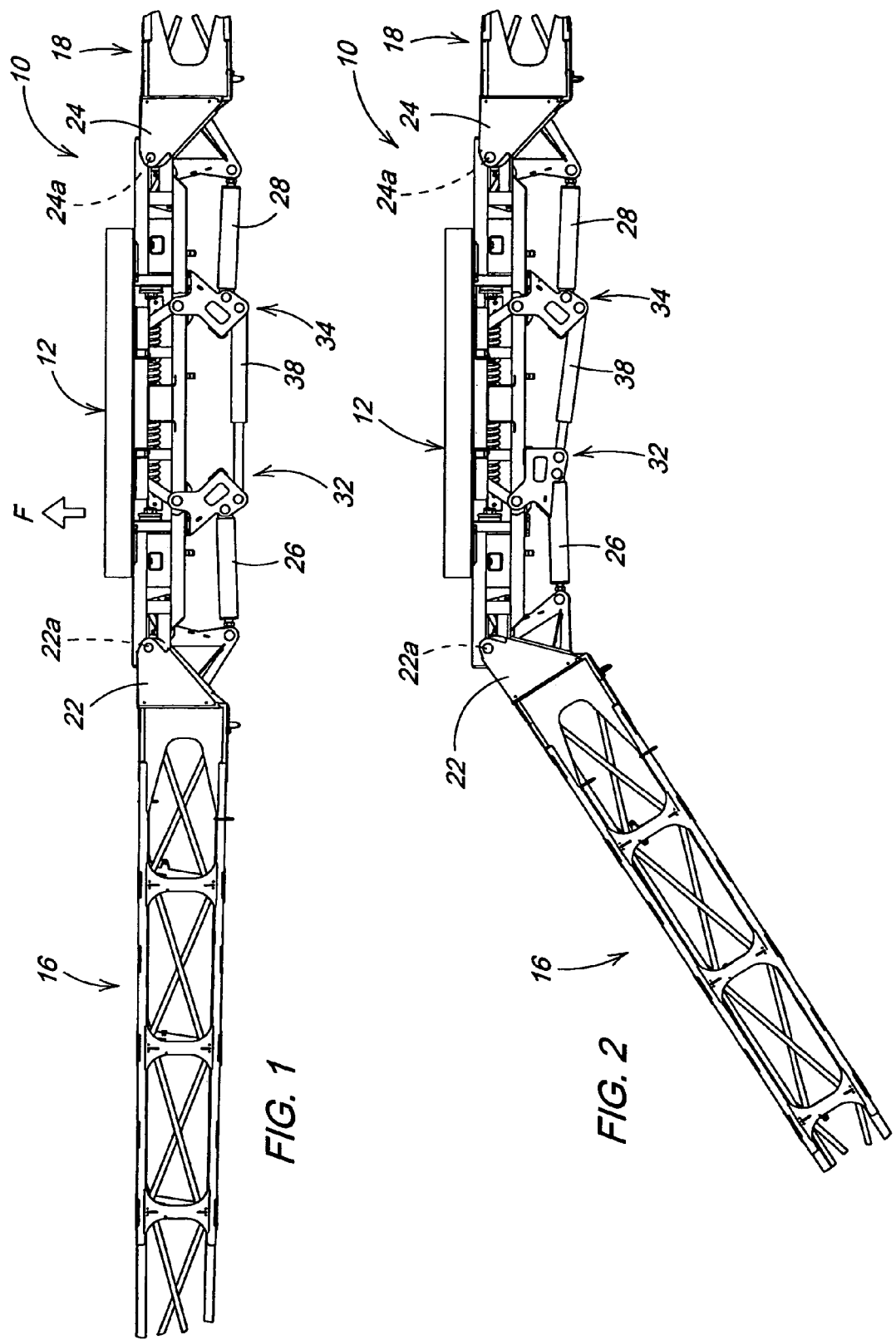
FIG. 1 is a top view of a portion of an agricultural sprayer boom assembly showing the left-hand boom section connected to a center frame assembly and in the extended field-working position.
FIG. 2 is a view similar to FIG. 1 but showing the left-hand boom section in a breakaway position.

Referring now to FIGS. 1 and 2, therein is shown a portion of an implement 10 having a cushioned center frame 12 carried on a vehicle frame (not shown) such as a self-propelled vehicle or towed trailer adapted for forward movement F over a field. Folding left-hand and right-hand inner boom sections 16 and 18 are connected by hinge structure 22 and 24, respectively, to opposite sides of the center frame 12 for pivoting about upright axes 22a and 24a between an outwardly directed field-working position (FIG. 1) and a forwardly folded transport position (not shown) by fold cylinders 26 and 28. Additional outer wing sections can be attached to the ends of the boom sections 16 and 18 to provide a working width of up to 120 feet or more.

The fold cylinders 26 and 28 are connected to rocker structures indicated generally at 32 and 34. The rocker structures are pivotally connected to the center frame 12 and to ends of the fold cylinders 26 and 28. A breakaway cylinder 38 is connected between the rocker structure 32 and 34 for maintaining the boom sections 16 and 18 in the working position (FIG. 1) during normal operation while permitting one or both sections to move to a breakaway condition (FIG. 2) when the sections encounter an obstacle.

As best seen in FIGS. 3–6, the rocker structures 32 and 34 are generally mirror images of each other and include pivots 42 and 44 and outer stops 46 and 48 radially offset from the pivots for bottoming against the center frame 12 when the breakaway cylinder 38 is in a fully extended position (FIG. 3). The cylinder 38 normally acts as a solid link during operation of the implement 10 unless one or both booms encounter obstructions. The base ends of the fold cylinders 26 and 28 are pivotally connected to the rocker structures 32 and 34 rearwardly of the pivots 42 and 44. The rod ends of the fold cylinders 26 and 28 are pivotally connected to hinge arms 52 and 54 that extend radially outwardly from the hinge axes 22a and 24a. With the breakaway cylinder 38 extended and the fold cylinders 26 and 28 retracted (FIG. 1), the stops 46 and 48 bottom against the frame 12, and the boom sections 16 and 18 extend laterally from the frame 12. The maximum extension of the cylinder 38 when the stops bottom against the frame is slightly less than full stroke of the cylinder to assure constant pressure on the linkage and avoid looseness in the system. To fold each of the booms sections approximately 90 degrees towards a forward transport or storage position, the cylinders 26 and 28 are extended by conventional hydraulic folding structure on the implement 10.

Figure 5:
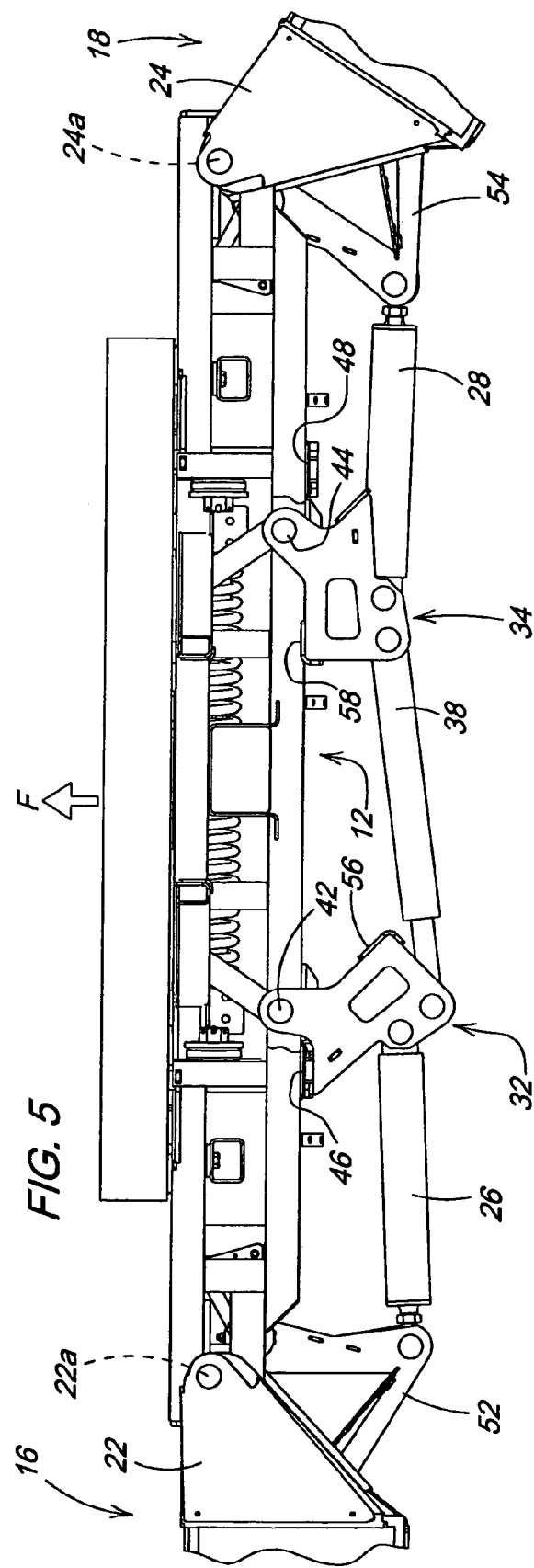
FIG. 5 is a view similar to FIG. 4 but showing the right-hand boom section in the breakaway position and the left-hand boom section in the extended position.

The rocker structures 32 and 34 also include inner stops 56 and 58 to limit pivoting of the structures when obstacles are encountered by the boom. For example, when the left-hand boom section 16 encounters an obstacle and the breakaway cylinder 38 retracts from the fully extended position, the section 16 can pivot rearwardly (FIGS. 2 and 4) and pivot the rocker structure 32 counterclockwise until the stop 56 bottoms against the frame 12. FIG. 5 shows the rocker structure 34 pivoted in the clockwise direction with the stop 58 bottoming against the frame 12 when the boom section 18 encounters an obstacle and moves to the full breakaway position. As shown in FIGS. 1–5, an individual boom section can fold rearwardly up to approximately 33 degrees in a breakaway situation, which provides nearly five feet of breakaway clearance on a boom assembly folded or configured to spray a 70-foot width. In addition, both sections 16 and 18 can simultaneously move towards breakaway positions of lesser angles than those of the full breakaway positions.

Figure 6:
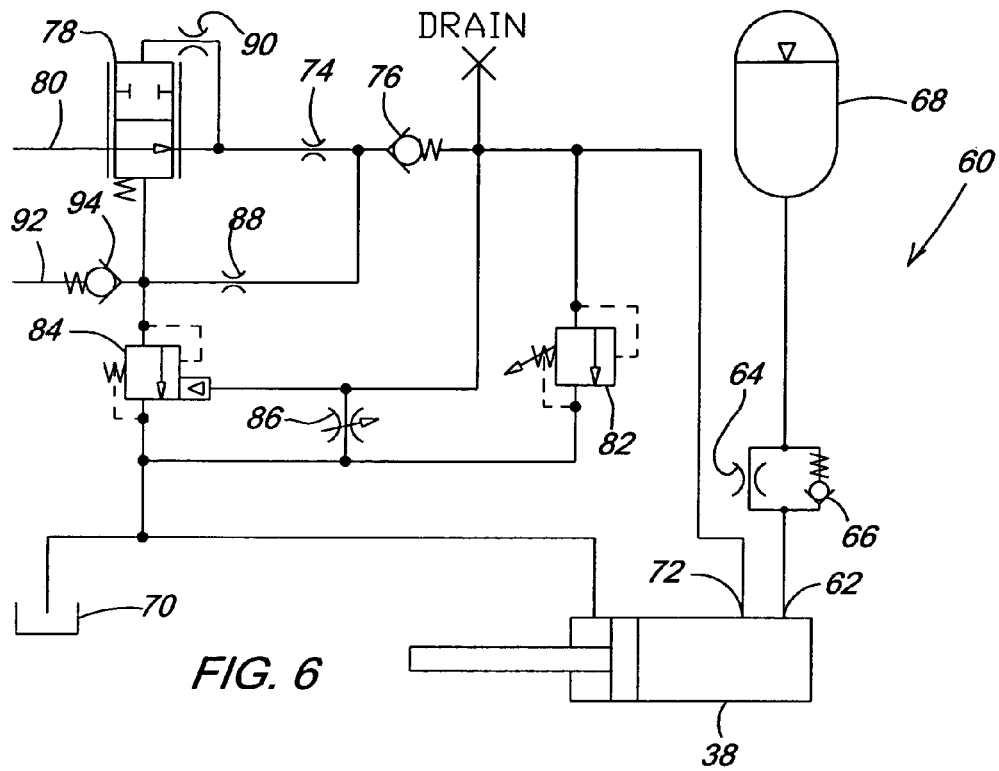
FIG. 6 is a schematic of the hydraulic system utilized in the breakaway system.

A hydraulic circuit 60 is connected to the breakaway cylinder 38 to normally pressurize the cylinder towards a full stroke position as shown in FIGS. 1, 3 and 6. If sufficient load is placed on the breakaway cylinder 38, the circuit 60 allows the cylinder to retract so the boom section or sections encountering obstruction can move rearwardly towards the breakaway position. The circuit 60 establishes a controlled pressure build-up which hydraulically absorbs boom impact energy before the cylinder 38 reaches full stroke. The pressure curve is controlled by the circuit 60 to prevent boom momentum increases and to limit boom loads so the strength of the overall boom structure is not exceeded.

As shown in FIG. 6, the base end of the breakaway cylinder 38 is connected via rear or first port 62 to a restrictor or orifice 64 and a check valve 66. The orifice 64 and check valve 66 are connected in parallel between the base end of the cylinder 38 and an accumulator 68 which is precharged to approximately 1400 psi. The rod end of the cylinder 38 is connected to reservoir 70. An intermediate or second port 72 offset in the direction of cylinder stroke forwardly of the port 62 near the base end of the cylinder 38 is connected through an orifice 74 and a one-way check valve 76 to a pressure compensator valve 78 connected to a source of hydraulic pressure or pump pressure line 80 on the vehicle 10. A differential area poppet or pressure relief valve 82 is connected between the cylinder port 72 and reservoir 70. An unloading pilot valve 84 with internal drain is controllably connected to the pressure compensator valve 78. A needle valve 86 is connected between the port 72 and the reservoir 70 for relieving the system pressure for service. A line having an orifice 88 connects the input end of the valve 84 and one pressure sensing input of the valve 78 to a location between the orifice 74 and the check valve 76. The opposite pressure sensing input of the valve 78 is connected through an orifice 90 to the output line of the valve 78. A load sensing line 92 from the hydraulic pump is connected through a check valve 94 to the valve 84.

After a system pressure reduction caused, for example, by breakaway events, system leakages or a pressure release for service or storage, hydraulic fluid under pressure is communicated from the line 80 through the compensator valve 78. The valve 84 measures hydraulic system pressure and allows the pump to pressurize the system through valve 78 until the predetermined pressure of the valve is reached.

Figure 7:
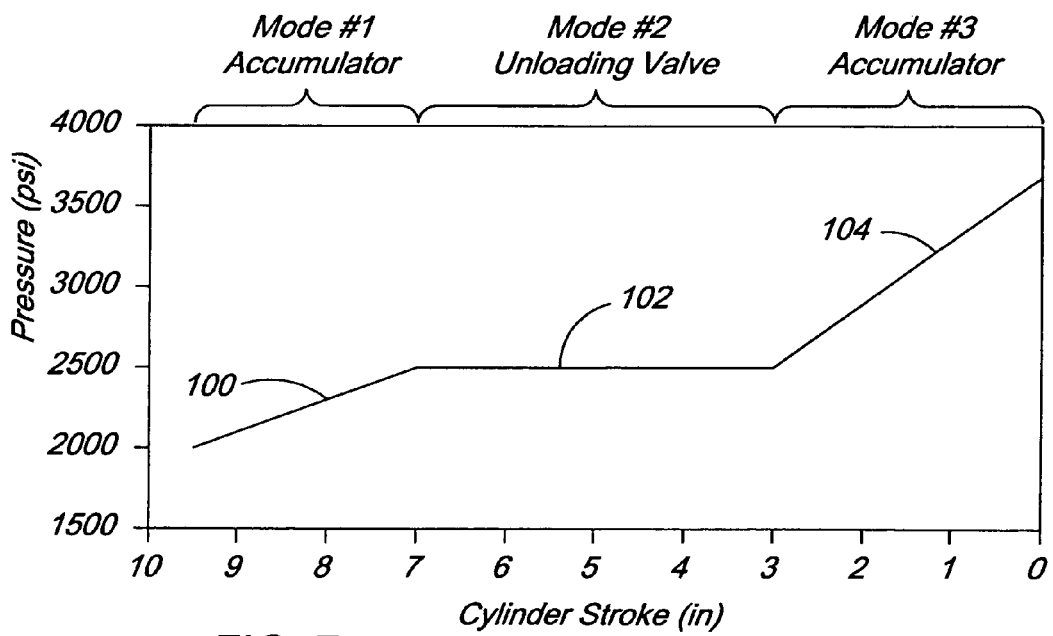
FIG. 7 is graph showing an example of a breakaway cylinder pressure curve.

In operation, in a first or field-operational mode, intermittent loading caused by the dynamic effects of motion on the boom structure tends to compress the cylinder 38. Such compression instantly forces hydraulic fluid through port 62 into the hydraulic accumulator 68 through the one-way check valve 66. Cylinder pressure builds as shown along section 100 of the graph of FIG. 7. Return flow to the cylinder 38 is through orifice 64 to control the speed at which the boom section returns to position. FIG. 7 is merely representative of one possible example of a breakaway cylinder pressure curve, and it is to be understood that numerous other curves can be provided dependent on the physical characteristics of the boom system and the response desired.

In a second or initial breakaway mode when a boom section continues to move towards a breakaway position, cylinder pressure builds towards a preselected pressure determined by the valve 82. At the preselected pressure, which in the example shown is between 1500 and 2000 psi, the valve 82 opens and hydraulic fluid will begin to flow through the port 72 to reservoir. A generally level pressure is maintained by the valve 82, illustrated by section 102 of the pressure curve of FIG. 7, until the cylinder piston passes the port 72.

In a third or final breakaway mode which is initiated when the cylinder piston interrupts flow through the port 72, hydraulic fluid is forced through the port 62 and into the accumulator 68. Pressure builds as shown in section 104 of the pressure curve of FIG. 7 until the boom section moves to the maximum breakaway position (FIG. 2). In an alternate embodiment, the valve 82 may be connected to the port 62 with a position responsive cut-off valve inserted in the valve line to close the relief valve circuit in the last several inches of the stroke of the breakaway cylinder 38. The arrangement of FIG. 6 with the offset ports 38 and 62 provides a simpler and less expensive solution, however.

The staged pressure build provided by the hydraulic circuit 60 effectively absorbs the impact energy hydraulically before the cylinder 38 reaches full stroke. After the obstacle is passed by the boom section, the cylinder 38 will extend to return the section to a normal operating position. The valve 84 senses reduced hydraulic system pressure and allows the pump to pressurize the system through the valve 78 until the system is again at normal operating pressure.

Having described the preferred embodiment, it will become apparent that various modifications can be made without departing from the scope of the invention as defined in the accompanying claims.

The invention claimed is:

1. A boom assembly connected to a source of hydraulic fluid under pressure and to a reservoir, the boom assembly including a boom support frame, a boom section pivotally connected to the boom support frame for movement between a working position and a breakaway position, a hydraulic breakaway cylinder having a first condition for maintaining the boom section in the working position and a breakaway condition permitting movement of the boom section towards the breakaway position when the boom section encounters an obstacle, hydraulic valve structure connected to the breakaway cylinder, an accumulator connected to the breakaway cylinder, wherein the hydraulic valve structure and the accumulator provide staged pressure control of breakaway cylinder operating pressure to absorb energy as the boom section moves from the working position, the accumulator providing increasing staged pressure as the boom section approaches the breakaway position to limit momentum of the boom section.

2. The boom assembly as set forth in claim 1 wherein the boom section comprises an inner wing of an agricultural sprayer boom.

3. The boom assembly as set forth in claim 1 wherein the accumulator and the hydraulic valve structure are connected to an end of the breakaway cylinder, the breakaway cylinder assuming an extended condition when the boom section is in the working position and a retracted position when the boom section is in the breakaway position.

4. The boom assembly as set forth in claim 1 wherein the accumulator and the hydraulic valve structure define a first stage wherein the accumulator absorbs energy from the boom section upon the boom section encountering the obstacle.

5. The boom assembly as set forth in claim 4 wherein the accumulator and the hydraulic valve structure define an intermediate stage wherein the valve structure provides resistance to flow of breakaway cylinder hydraulic flow to absorb energy from the boom section when the boom section is between the working and breakaway positions.

6. The boom assembly as set forth in claim 1 wherein the accumulator and the hydraulic valve structure define a full breakaway stage wherein the accumulator absorbs energy from the boom as the boom approaches the breakaway position.

7. The boom assembly as set forth in claim 6 wherein the accumulator and the hydraulic valve structure define an intermediate stage wherein the valve structure provides resistance to flow of breakaway cylinder hydraulic flow to absorb energy from the boom section when the boom section is between the working and breakaway positions.

8. The boom assembly as set forth in claim 1 wherein during at least one of the stages the hydraulic valve structure controls absorption of energy from the boom section and during another of the stages the accumulator provides absorption of energy from the boom section.

9. The boom assembly as set forth in claim 1 wherein the hydraulic valve structure provides absorption of the energy at an intermediate position of boom section by restricting hydraulic fluid flow relative to the breakaway cylinder at the intermediate position, and the accumulator provides absorption of the energy as the boom section approaches the breakaway position.

10. The boom assembly as set forth in claim 1 wherein the hydraulic valve structure provides absorption of the energy at an intermediate position of boom section by restricting hydraulic fluid flow relative to the breakaway cylinder at the intermediate position and the accumulator provides an initial absorption of the energy as the boom section encounters the obstacle and begins to move away from the working position.

11. A boom assembly including a boom support frame, a boom section pivotally connected to the boom support frame for movement between a working position and a breakaway position, a hydraulic breakaway cylinder having a first condition for maintaining the boom section in the working position and a breakaway condition permitting movement of the boom section towards the breakaway position when the boom section encounters an obstacle, hydraulic valve structure connected to the breakaway cylinder, an accumulator connected to the breakaway cylinder, wherein the hydraulic valve structure and the accumulator provide staged pressure control of breakaway cylinder operating pressure to absorb energy as the boom section moves from the working position, the staged pressure increasing as the boom section approaches the breakaway position to limit momentum of the boom section wherein the hydraulic valve structure includes a relief valve connected to the breakaway cylinder and responsive to pressure in the breakaway cylinder, the accumulator providing substantially all the absorption of energy until the relief valve responds to increasing pressure in the breakaway cylinder.

12. A boom assembly including a boom support frame, a boom section pivotally connected to the boom support frame for movement between a working position and a breakaway position, a hydraulic breakaway cylinder having a first condition for maintaining the boom section in the working position and a breakaway condition permitting movement of the boom section towards the breakaway position when the boom section encounters an obstacle, hydraulic valve structure connected to the breakaway cylinder, an accumulator connected to the breakaway cylinder, wherein the hydraulic valve structure and the accumulator provide staged pressure control of breakaway cylinder operating pressure to absorb energy as the boom section moves from the working position, the staged pressure increasing as the boom section approaches the breakaway position to limit momentum of the boom section; and including a second boom section pivotally connected to the boom support frame and to the breakaway cylinder, wherein the accumulator and the hydraulic circuit provide energy absorption for the second boom section when the second boom section encounters obstacles.

13. The boom assembly as set forth in claim 12 including a rocker assembly connecting the breakaway cylinder to both the boom sections.

14. The boom assembly as set forth in claim 13 further comprising fold cylinder structure connected between the rocker assembly and the boom sections for moving the boom sections from the working position to a folded transport position.

15. A boom assembly attachable to a source of hydraulic fluid under pressure and to a reservoir, the boom assembly including a boom support frame, a boom section pivotally connected to the boom support frame for movement between a working position and a breakaway position, a hydraulic breakaway cylinder connected to the boom section, the breakaway cylinder having a cylinder stroke dependent on boom section position, an accumulator connected to the breakaway cylinder, the accumulator providing an increasing cylinder pressure as the boom section moves from the working position towards the breakaway position, and a relief valve connected to the breakaway cylinder, the accumulator and the relief valve defining a cylinder pressure curve which initially increases with cylinder stroke as the boom assembly moves from the working position, the pressure curve generally leveling along an intermediate range of positions of the cylinder stroke and then increasing with cylinder stroke as the boom section approaches the breakaway position.

16. The boom assembly as set forth in claim 15 wherein the boom section comprises in inner boom section.

17. The boom assembly as set forth in claim 15 wherein the breakaway cylinder includes a first port connected to the accumulator and a second port offset in a cylinder stroke direction from the first port and connected to the relief valve, wherein at least one of the first and second ports is blocked during a portion of the cylinder stroke.

18. The boom assembly as set forth in claim 17 wherein the hydraulic valve structure and the accumulator provide at least first, second and third stages of pressure control of the breakaway cylinder to absorb energy as the boom section moves from the working position to the breakaway position.

19. A boom assembly including a boom support frame, a boom section pivotally connected to the boom support frame for movement between a working position and a breakaway position, a hydraulic breakaway cylinder connected to the boom section, the breakaway cylinder having a cylinder stroke dependent on boom section position, an accumulator connected to the breakaway cylinder to provide an increasing cylinder pressure as the boom section moves from the working position towards the breakaway position, and a relief valve connected to the breakaway cylinder, the accumulator and the relief valve defining a cylinder pressure curve which initially increases with cylinder stroke as the boom assembly moves from the working position, the pressure curve generally leveling along an intermediate range of positions of the cylinder stroke and then increasing with cylinder stroke as the boom section approaches the breakaway position; wherein the breakaway cylinder includes a first port connected to the accumulator and a second port offset in a cylinder stroke direction from the first port and connected to the relief valve, wherein at least one of the first and second ports is blocked during a portion of the cylinder stroke; and wherein the first port remains unblocked during substantially the entire cylinder stroke and the second port is blocked as the boom section approaches the breakaway position.

20. A boom assembly connected to a source of hydraulic pressure and to a reservoir, the boom assembly including a boom support, a boom section pivotally connected to the boom support for movement between a working position and a breakaway position, a hydraulic breakaway cylinder biasing the boom section to the working position, valve structure, an accumulator, and means connecting the valve structure and the accumulator to the source, the reservoir and the breakaway cylinder to provide pressure control of breakaway cylinder operating pressure to absorb energy as the boom section moves from the working position, wherein the staged pressure increases as the boom section approaches the breakaway position to limit momentum of the boom section.

21. The boom assembly as set forth in claim 20 wherein the valve structure includes a pressure relief valve controlling cylinder pressure over a portion of the stroke, and wherein the accumulator provides an increasing cylinder pressure near an extremity of the stroke.

22. The boom assembly as set forth in claim 21 including means for blocking the valve structure near the extremity of the stroke.

23. A boom assembly including a boom support, a boom section pivotally connected to the boom support for movement between a working position and a breakaway position, a hydraulic breakaway cylinder biasing the boom section to the working position, valve structure, an accumulator, and means connecting the valve structure and the accumulator to the breakaway cylinder to provide pressure control of breakaway cylinder operating pressure to absorb energy as the boom section moves from the working position, wherein the staged pressure increases as the boom section approaches the breakaway position to limit momentum of the boom section; and wherein the means connecting the valve structure and the accumulator to the breakaway cylinder comprises first and second cylinder ports located on the breakaway cylinder, the breakaway cylinder having a stroke and wherein the ports are offset in a direction of the stroke and during a portion of the stroke at least one of the ports is blocked, and first and second hydraulic lines connecting the accumulator and the valve structure to the first and second ports, respectively.

24. A boom assembly including a boom support, a boom section pivotally connected to the boom support for movement between a working position and a breakaway position, a hydraulic breakaway cylinder biasing the boom section to the working position, valve structure, an accumulator, and means connecting the valve structure and the accumulator to the breakaway cylinder to provide pressure control of breakaway cylinder operating pressure to absorb energy as the boom section moves from the working position, wherein the staged pressure increases as the boom section approaches the breakaway position to limit momentum of the boom section; and wherein the accumulator provides increasing cylinder pressure with stroke at an initial stroke position and at a final stroke position, and wherein the valve structure defines cylinder pressure at an intermediate stroke location.

* * * * *